Sept. 11, 1928.　　　　　　　　　　　　　　　1,684,172
J. M. DAYTON
INTERMITTENT BALL CLUTCH
Filed June 3, 1927
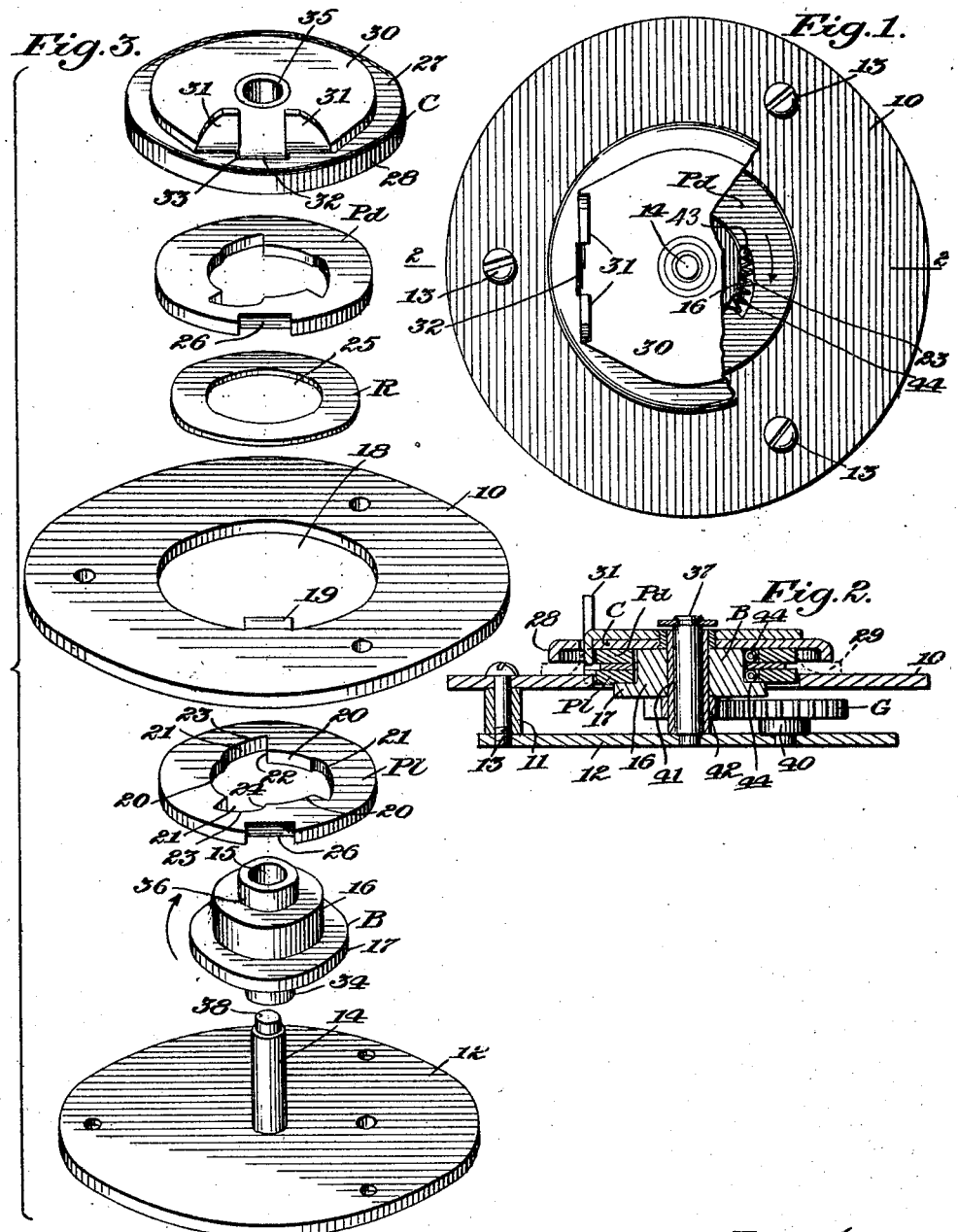
Inventor:
James M. Dayton,
By Sturtevant & Mason
Att'ys.

Patented Sept. 11, 1928.

1,684,172

UNITED STATES PATENT OFFICE.

JAMES M. DAYTON, OF TORRINGTON, CONNECTICUT.

INTERMITTENT BALL CLUTCH.

Application filed June 3, 1927. Serial No. 196,320.

This invention relates to improvements in ball clutches, and is more particularly directed to improvements in such devices whereby the elements are self-alined.

In my copending application Serial No. 167,799, filed Feb. 12, 1927, I have illustrated several applications of such self-alining clutches, but have not claimed such generically. The present application demonstrates the conception and presents claims to the structure of such clutches.

The present clutch is composed of relatively few members, which need not be accurately machined, and which need not be located in a carefully predetermined and maintained position with regard to each other. Several of these members are identical in form as between themselves, so that a very small stock of parts is required in making up the device: but at the same time, even these members need not be identically constructed as to dimensions in order to assure the positive and accurate operation of the device.

One form of execution according to the present invention is set forth on the accompanying drawings, which illustrate an intermittent ball clutch having a retaining member to prevent a retrograde movement, and is particularly applied for the operation of a counting device which sums up movements in one direction, but is unaffected by movements in the other direction.

On these drawings:

Figure 1 is a face view of the base plate of the counting device, with the clutch members assembled therewith, parts of the same being broken away for demonstration of the relationship of the several parts.

Fig. 2 is a sectional view of the same substantially on line 2—2 of Fig. 1.

Fig. 3 is an exploded view showing the various members excepting the balls and springs, in their relative position but axially separated for greater clearness.

Intermittent ball clutches of this type comprise a central core member having a circular periphery, and a pair of clutch rings surrounding the core adjacent this periphery and having balls as engaging elements to become wedged between the walls of the notches in the clutch plates and this cylindrical periphery, whereby a relative movement of a clutch plate with regard to the core in one direction will cause the respective balls to wedge and lock the members together for rotation, whereas a movement of the clutch plate in the opposite direction will remove the balls from their wedged position to a free position, so that the clutch plate may move freely relative to the clutch core. In the present illustration two such clutch plates have been employed, one being maintained stationary so that the core may make a relative movement with regard to it, and be retained by the balls appertaining to this clutch plate against a retrograde rotation; while the other clutch plate is driven, and through its balls causes a movement of the clutch core in the prescribed direction by the angular distance of its own travel, and yet is free to return in the opposite direction of rotation without an actuation of the clutch core.

In these drawings, the base plate 10 of a counting device is represented as having a number of pillars 11 thereon to support a bottom plate 12: these plates being locked together by the screws 13.

Rigidly fastened in the bottom plate 12 is an upstanding spindle or post 14 which fits within the central bore 15 of the core body B. This core body has a portion with a cylindrical periphery, terminating in an outstanding flange 17 having its upper surface substantially at right angles to the peripheral cylindrical surface 16.

The base plate 10 has a large aperture 18 therethrough, with a lug 19 extending inwardly toward the center of the aperture.

Two clutch plates $Pd$ and $Pl$ are employed in the illustrated device. The clutch plate $Pd$ is the driving plate and serves to cause a rotation of the clutch core B with respect to the base plate 10: while the clutch plate $Pl$ is a locking plate and holds the clutch core against a retrograde movement with respect to the base plate 10. These two clutch plates are substantially identical in their construction, except for minor inaccuracies which may arise in their manufacture. They may be made by simple punching operations, care only being taken to prevent major burrs from remaining, and in assuring that the circular line defined by the inward peripheries 20 is of slightly larger diameter than the cylindrical portion 16 of the central core body B. Each of these plates is represented as having three notches 21, and each has a wall 22 substantially radial with regard to the circle defined by the surfaces 20, 20, 20; and a wall 23 which curves inward toward such center, and may end in an abrupt inward curve 24.

It will be understood that the upper surface 17 of the flange on the core body B covers the notches 21 of the adjacent clutch plate: and that a spacing ring R is fitted between the two clutch plates. This spacing ring has a central aperture 25 of substantially the same diameter as the cylindrical portion 16 of the core body B and the circle defined by the surfaces 20, 20, 20 of the respective rings.

Each of the clutch plates is provided with a notch 26 in its periphery, for the driving or the locking of the respective plate.

The notches 21 of the driving plate Pd are covered by the flat radial wall 27 of a cup member C, which has a cylindrical downwardly extending flange 28 which is substantially coaxial with the periphery of the clutch plate Pd, and is spaced beyond it for the reception of a packing felt washer 29 therebetween. The driving member 30 is provided with two upstanding lugs 31 with a space between. This member 30 is formed of sheet metal, and the material left in forcing the lugs 31 upward to substantial right angles with regard to the body of the plate 30, is turned downward to form a driving lug 32, which passes through an aperture 33 in the radial surface of the cup C, and enters the notch 26 of the clutch plate Pd filling this notch and preventing any relative rotational movement between the cup C and the clutch plate Pd.

In assembling the clutch device as so far described, the bottom plate 12 is assembled by its pillars 11 and screws 13 with regard to the base plate 10. The upstanding post 14 has its axis concentric with the axis of the aperture 18. The core body B is then slipped over the post 14 which forms a rotating spindle foot, so that the bottom end 34 of this core body rests against the bottom plate 12 as a thrust bearing. The clutch plate Pl is then slipped loosely over the cylindrical portion 16 of the core body B, and its notch 26 is engaged with the lug 19 on the base plate 10, which is a tight fit therewith so that no relative movements are possible between the base plate 10 and the clutch plate Pl. The balls and springs are then assembled in the notches 21 of the clutch plate Pl as indicated in Fig. 1. The spacing ring R is then slipped loosely onto the cylindrical portion 16, and then the second clutch ring or driving ring Pd is likewise located upon this cylindrical portion 16, and its balls and springs are put in position. It will be noted that the notches 21 of the respective rings are located in the same directions. The cup C is then placed in position and its assembling bushing 35 is slipped over the upper end 36 of the core body B. Any suitable means such as a retaining washer 37 (Fig. 2) may then be slipped over the extreme end 38 of the spindle 14, and if desired the end of the spindle may be riveted over lightly to hold the washer in position, but it will be understood that such is merely indicated as one possibility of securing the assembly together, and that any other means may be employed.

The assembly thus perfected is self-alining, since the clutch plates Pl and Pd need not be located exactly at right angles to the axis of the spindle 14 and of the core body B, nor need the peripheral surfaces of these plates be smoothly finished, nor need the internal surfaces of these plates or of the ring R or of the base plate 10 be finished to a high degree, since ordinary mechanical limits of error are permissible, provided that no large burrs are formed. It is preferred to form the core body B of hardened steel, to resist wear, while the clutch plates Pl and Pd may be punched from sheet steel, with a possible brushing operation to finish the circular inner peripheries 20, 20, 20, and the walls 23 of the notches: but it has been found in practice that even this is unnecessary in obtaining great sensitiveness of movement.

In Fig. 2 the device has been shown as provided on a counting device, for driving the first gear G of the counting train, this gear being mounted on a spindle pivot 40. For driving this gear G, the core body has been illustrated as made of the hardened steel cylindrical portion 16 with flange 17, which is mounted upon a brass bearing sleeve 41 which extends at its ends beyond the portions 16 and 17 to form the projecting ends 34 and 36 of Fig. 3: and which has tightly fitted thereto the driving pinion 42 for meshing the gear G.

The method of operation of this device is as follows: The driving finger of a moving element whose movement is to be counted, is engaged between the upstanding lugs 31, 31 of the driving member 30. As the driving finger rotates about an axis concentric with the spindle 14, the driving member 30 is moved therewith through the same angular distance, and in a clockwise direction, for example. The downwardly extending lug 32 of the driving member 30 engages the clutch plate Pd at its notch 26, and moves this clutch plate Pd in a clockwise direction as indicated by the arrow in Fig. 1, so that the balls 43 of this plate engage between the cylindrical wall 16 of the clutch body B and the inwardly curving wall 23 of the respective notches, and lock between these walls so that the driving member 30 and the driving plate Pd turn together, and with them the core body B. Since the clutch plate Pl is held stationary by the base plate 10, the relative rotation of the core body B within it causes its balls to be moved relatively clockwise along the walls 23, against the pressures of the respective springs 44 thereof, with a free slippage, so that very little friction exists between the several members. This continues so long as the driving member 30 moves in a clockwise direction.

After having completed its clockwise stroke, the driving member 30 may begin a counterclockwise movement, whereupon the balls 43 on the clutch plate Pl are forced by their springs 44 into the angle between the cylindrical wall 16 and the wall 23 of their respective notches, and establish a wedging relation between the clutch plate Pl and the core body B, so that the core body is held against retrograde movement. At the same time, the balls 43 of the driving clutch plate Pd react against their springs 44 and move freely over the surface 16 of the retained core body B, with very little friction.

It will be understood that the relative movement of the balls 43 during the course of this alternation is very slight: and it has been found in practice that less than .01 of an inch of relative movement between the driving member 30 and the base plate 10 will be accurately summed up by this intermittent clutch device, even with the relative inaccuracies in construction as noted. Since the gear 42 is mounted on the spindle 14, the final drive to the gear G is accurate under all conditions, regardless of variations between axial directions of the driving finger engaging the lugs 31 and the axis of the spindle 14, the relative positions of the several parts, etc.

From the foregoing, it will be noted that accuracy of the respective parts is not required for a proper operation. In addition to the points above set forth, it will particularly be noted that eccentricities of the cylindrical surface 16, whether arising in manufacture or as a result of uneven wear, will be harmless so long as the balls and springs do not slip from their respective cages, and so long as there is no physical blocking between the eccentric surface with respect to the arc defined by the surfaces 20, 20, 20. Likewise these latter surfaces need not be concentric with the surface 16, since the balls in their location within the notches and as engaged by the springs serve as an alining means for these plates, and in case that a full alinement is not obtained, the slight yielding on the part of the balls and springs will produce a full operation, even though a considerable departure from accuracy be involved. It is not necessary that the balls should be of the same size, so long as they are of less diameter than the thickness of the respective clutch plates: nor is the particular size of the notches 21 important, since the balls will move within the notches until they establish wedging relation. Furthermore, distortion of the clutch plates or of the spacer ring is not important, even though these be considerably out of plane, so long as no mechanical blocking occurs and so long as the respective notches retain their respective balls and springs.

The clutch plates may be considerably eccentric as regards the axis of the spindle 14 without harm, and even the clutch core itself as indicated above may be eccentric, so that the clutch plates will move during a single revolution of the clutch core, so long as the respective lugs engage their notches without a great amount of back-lash: and even this amount of back-lash may be determined according to the particular use for which the device is intended.

The invention is not limited to the specific example of execution shown, but may be modified within the scope of the appended claims.

Having thus described my invention, what I claim is:

1. In an intermittent clutch, a movable member including a cylindrical core, a bearing to support said core for rotation, two annular clutch plates having inclined notches at their inner peripheries, said peripheries fitting said core and being alined thereby, all of said notches being inclined in the same direction, a clutch ball and spring in each of said notches, means to hold one of said clutch plates, and a second movable member operatively connected to the other of said clutch plates.

2. In an intermittent clutch, a movable member including a cylindrical core, a bearing to support said core for rotation, an outwardly projecting flange on said core, two annular clutch plates of uniform thickness each having inclined notches cut through their thickness from one face to the other at their inner peripheries and each a notch cut through at their outer peripheries, a clutch ball and spring in each of said inner notches, said peripheries fitting said core and being alined thereby; a spacing washer between said plates, holding means for the one of said clutch plates adjacent said flange and including a lug in the plane of said clutch plate and projecting into its outer notch, and a second movable member including a plate resting against the free face of said other clutch plate and a lug entering the outer notch thereof; said flange, said washer and said member plate closing said inner notches.

3. In an intermittent clutch, two relatively rotatable members, one of said members including a substantially cylindrical core; two identical clutch bodies surrounding said core, identical clutch means in each of said bodies to engage said core in one direction of relative movement therebetween, said other member being operatively connected to one of said bodies; and means on said members to hold said body substantially in alinement.

4. In an intermittent clutch, a rotatable core having a substantially cylindrical surface, a fixed plate located substantially at right angles to the axis of said core and having an aperture substantially concentric with said core and providing a lug extending inwardly into said aperture, a circular clutch plate of lesser diameter than said aperture and having a notch in its periphery to engage said lug whereby to be retained against rotation relative to said fixed plate while permitting movement thereof within and into and out of said aperture, said clutch plate having an aperture whereby it loosely surrounds said clutch core at its cylindrical portion, said clutch plate also including notches with inclined surfaces, a clutch ball and a clutch spring in each of said notches, said ball being adapted to be moved by said spring into an engaged position between the said cylindrical portion and the inclined wall of said notch, and means to retain said balls and springs in said notches, whereby said balls and springs assist in the alining of said plate with respect to said core.

5. In an intermittent clutch, a movable member including a cylindrical core having a radial flange, said core being supported for rotation about its axis, two annular clutch plates having inclined notches at their inner peripheries, said clutch plates surrounding said core and being in floating alinement on and parallel to said flange, a clutch member in each of said notches to cooperate between the core and the respective plate, means to hold one of said clutch plates against rotation about the core, and a second movable member operatively connected to the other of said clutch plates to rock it about said core.

6. In an intermittent clutch, two relatively rotatable members, one of said members including a substantially cylindrical core having a radial flange, said other member including an annular clutch plate surrounding said core and in floating alinement on and parallel to said flange; and means to rock said clutch plate about its axis, said means permitting movements of the plate out of its plane.

In testimony whereof I affix my signature.

JAMES M. DAYTON.